June 12, 1956    C. A. HENRY    2,750,208
TRAILER FIFTH WHEEL COUPLING AND STEERING MECHANISM
Filed Jan. 22, 1953    2 Sheets-Sheet 1

INVENTOR.
CASHLY A. HENRY
BY
HIS ATTORNEY

June 12, 1956  C. A. HENRY  2,750,208
TRAILER FIFTH WHEEL COUPLING AND STEERING MECHANISM
Filed Jan. 22, 1953  2 Sheets-Sheet 2

INVENTOR.
CASHLY A. HENRY
BY
HIS ATTORNEY

United States Patent Office 2,750,208
Patented June 12, 1956

2,750,208

TRAILER FIFTH WHEEL COUPLING AND STEERING MECHANISM

Cashly A. Henry, Dayton, Ohio

Application January 22, 1953, Serial No. 332,620

2 Claims. (Cl. 280—426)

This invention relates to trailers. It relates to a trailer of the type having wheels that are steerable, the forward end of which trailer is adapted to be supported by another vehicle. The invention, also, relates to a four-wheel trailer of the type adapted to be pulled behind another vehicle. However, the invention is not necessarily limited to these types of trailers.

It is very desirable to have the wheels of a trailer follow the path taken by the forward wheels of the trailer or tractor. It is also very desirable that in a train of trailers the wheels of all of the trailers follow substantially the same path.

An object of this invention is to provide an adjustable mechanism for controlling the direction of movement of the wheels of a trailer, the mechanism being one which can be readily adapted for use in either a two-wheel trailer or a four-wheel trailer.

Another object of this invention is to provide an easily engageable mechanism for supporting the forward portion of the frame of a two-wheel trailer.

A further object of this invention is to provide an adjustable means for controlling the direction of movement of the wheels of the trailer.

Other objects and advantages reside in the construction of parts, the combination thereof and the mode of operation, as will become more apparent from the following description.

Referring to the drawings.

Figure 7:
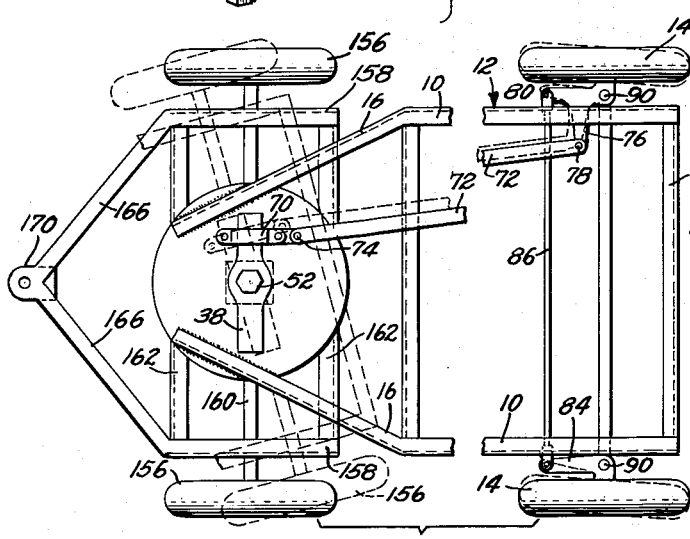

Figure 7 discloses another modification wherein the steering mechanism is associated with the front wheels of a four wheel trailer.

Referring to the drawings in detail, a frame 10 of a trailer 12 is partially supported by two rear wheels 14. The frame 10 has two angular forward portions 16 firmly fixed upon a bearing plate 18. Mounted in the center of the bearing plate 18 is an anti-friction bearing 20 which may be of either the roller type of bearing or the ball type of bearing. The anti-friction bearing supports the mechanism shown in Figure 5.

A support pin 22 has a threaded lower end 24 of comparatively small diameter. Immediately above the lower end 24 is a cylindrical portion 26 having a key slot 28 formed vertically in the cylindrical portion 26. Immediately above the cylindrical portion 26 is a larger cylindrical portion 30 of larger diameter than the cylindrical portion 26. Immediately above the cylindrical portion 30 is formed a cylindrical collar 32 of larger diameter than the cylindrical portion 30. Above the collar 32 is a serrated or knurled portion 34. The upper end 36 of the support pin 22 has substantially the same diameter as the lower end 24 and is also threaded.

The cylindrical portion 30 is inserted within the inner race of the bearing 20. The collar 32 is substantially equal in diameter to the outer diameter of the inner race of the bearing 20. This collar 32 thus provides a support surface for the member 22 upon the bearing 20. The support pin 22 may be either a screw machine piece in which the portions 24, 26, 30, 32, 34 and 36 are integral or the support pin 22 may be composed of separately manufactured elements threadedly attached to a bolt having ends 24 and 36.

A turning arm 38 is adapted to be supported upon the upper surface of the collar 32. The turning arm 38 has a centrally located aperture 40, internally serrated and adapted to snugly fit over the serrated portion 34 of the support pin 22.

Over the lower end of the support pin 22 is mounted a guide block 42. The guide block 42 is keyed upon the cylindrical portion 26 by means of a key 44 and the slot 28. Thus, the guide block 42 is nonrotatable with respect to the support pin 22. The guide block 42 is retained upon the support pin 22 by means of a washer 46 and a nut 48 which fit upon the lower end 24 of the support pin 22. The turning arm 38 is retained in engagement with the serrated portion 34 by means of a washer 50 and a nut 52 which fit upon the end 36 of the support pin 22.

Figure 4:
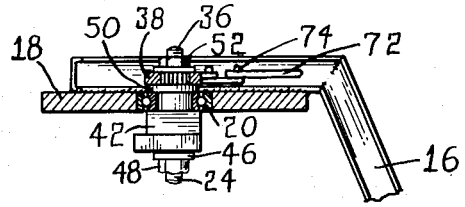
Figure 4 is a fragmentary side view of the forward end of a trailer showing a mechanism adapted to be inserted into the supporting member shown in Figure 3.
Figure 5:
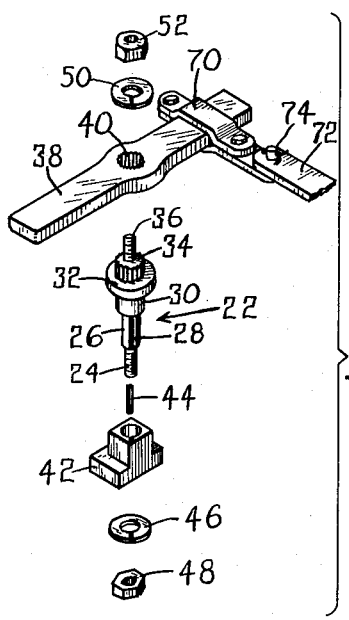
Figure 5 is an exploded view of a turning arm and associated mechanism.
Figure 6:
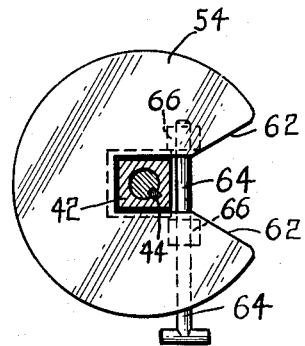
Figure 6 is a support plate adapted to receive the forward end of a two-wheel trailer. A portion of the engaged mechanism of the trailer is shown.

A side elevational view of the assembled elements shown in Figure 5 is disclosed in Figure 4. This assembly is rotatably mounted within the bearing plate 18 by means of the bearing 20. Figure 4 shows the entire assembly upon the forward frame portion 16 of the trailer 12. The entire assembly, as shown in Figure 4, is adapted to be supported upon a support plate 54. The support plate 54 is rigidly attached over the rear wheels 56 of a supporting vehicle 58.

Figure 2:
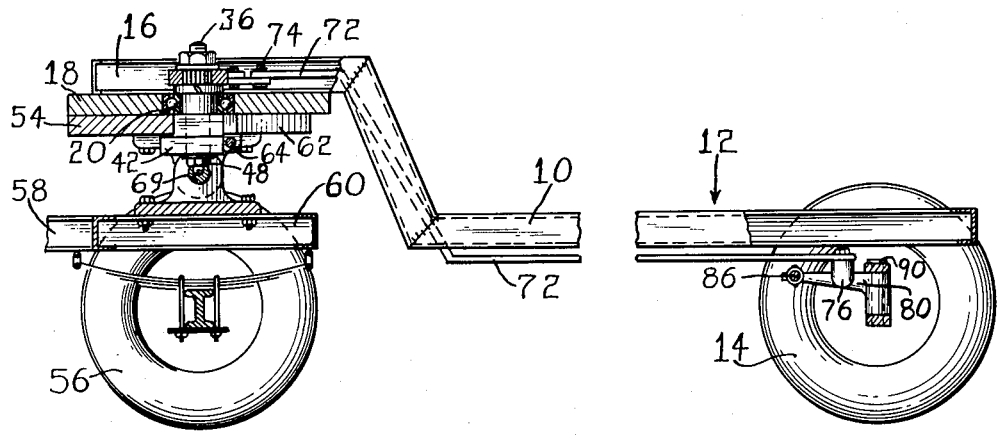
Figure 2 is a side elevational view of the mechanism shown in Figure 1 with a portion of the mechanism shown in section.
Figure 3:
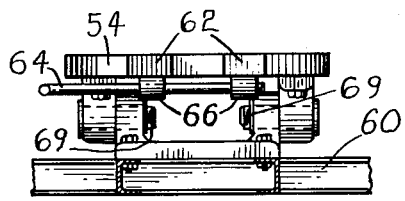
Figure 3 is a rear view of a support mounted upon the rear portion of a supporting vehicle adapted to receive the forward portion of a two-wheel trailer.

Figures 2 and 3 clearly show the support plate 54 attached upon a frame 60 at the rear end of the supporting vehicle 58. The support plate 54 has a notch having two radially diverging edges 62. The center of the support plate 54 has a rectangular opening adapted to receive the guide block 42 which is attached to the support pin 22 at the forward end of the trailer 12. When it is desired to attach the trailer 12 to the supporting vehicle 58, the forward frame 16 of the trailer 12 is positioned at such a height that the bearing plate 18 will be slightly higher than the support plate 54 on the supporting vehicle 58. The supporting vehicle 58 is moved in a reverse direction toward the forward end of the trailer 12. The edges 62 of the support plate 54 aid in directing the guide block 42 into the center of the support plate 54. The bearing plate 18 is then concentric with the support plate 54. The support plate 54 thus supports the bearing plate 18 by means of the bearing 20. The bearing plate 18 is locked into position upon the support plate 54 by means of a pin 64 inserted behind the guide block 42 and through sleeves 66. The sleeves 66 are on the lower surface of the support plate 54.

Figure 1:
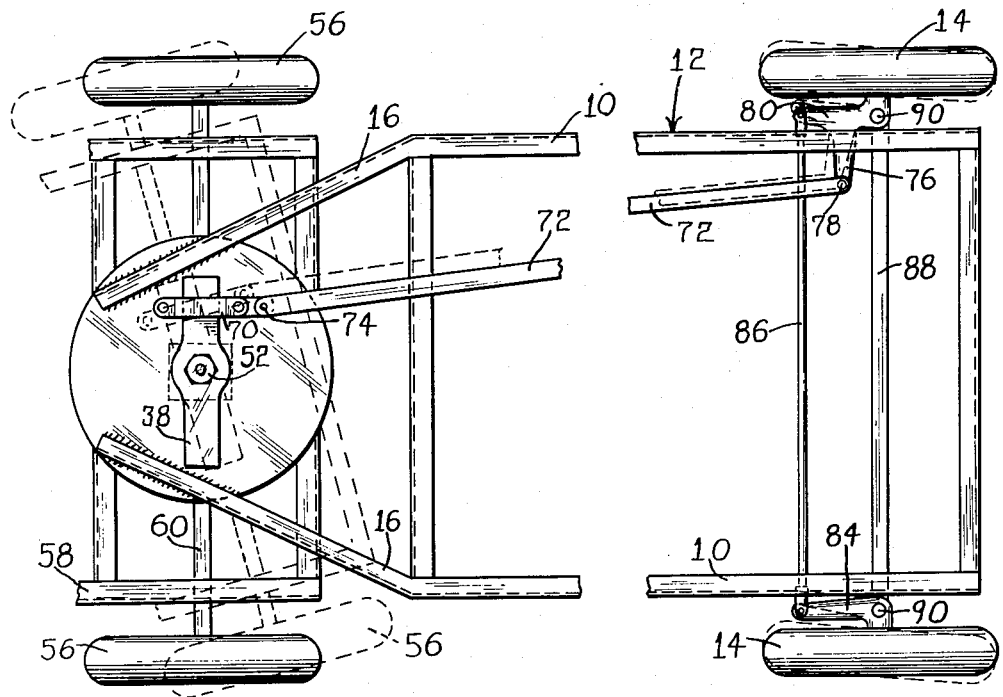
Figure 1 is a plan view of a two-wheel trailer supported upon the rear axle of another vehicle.

When the supporting vehicle 58 is turned, as shown by means of the dotted lines in Figure 1, the support plate 54 rotates or turns with the supporting vehicle 58, due to the fact that the support plate 54 is rigidly attached to the rear portion of the supporting vehicle 58. The rectangular guide block 42 engages the edges of the centrally located rectangular opening in the support plate 54. Consequently, the guide block 42 rotates with the support plate 54. Due to the fact that all of the elements as shown in Figure 5 are firmly attached one to the other, the turning arm 38 will be rotated angularly at the same rate at which the rear portion of the supporting vehicle 58 turns.

The bearing plate 18 does not rotate with rotation of the support plate 54. The bearing plate 18 rests upon the support plate 54 and, therefore, the support plate 54 frictionally rotates under the bearing plate 18 as the vehicle 58 is turned. The engaging surfaces of the bearing plate 18 and the support plate 54 are lubricated to reduce the frictional forces between them.

The support plate 54 is pivotally mounted upon the frame 60 by means of pins 69. This provides means by which the support plate 54 can rotate in a vertical plane and maintain proper engagement with the bearing plate 18 as the trailer 12 is propelled over hills and other un-level road surfaces.

At one end of the turning arm 38 is mounted a clamp 70. To the clamp 70 is pivotally mounted a connecting bar 72. The connecting bar 72 is attached to the clamp 70 by means of a pintle 74. The connecting bar 72 extends rearwardly within the trailer 12. The rearward end of the connecting bar 72 is pivotally attached to an arm 76 by means of a pintle 78.

The arm 76 is integral with a link 80 of the steering mechanism for the rear wheels 14. As best shown in Figure 1, the link 80 and a link 84 are L-shaped members having one leg of the L attached to a transverse rod 86. The other leg of each L-member supports a wheel 14. The wheels 14 are pivotally attached to an axle 88 by means of vertical pins 90. The pins 90 are inserted through the L-shaped links 80 and 84.

Therefore, as may be clearly understood, movement of the connecting bar 72 actuates turning of the wheels 14 through the pivotal movement of the arm 76, the links 80 and 84, and the rod 86. Thus, it may be understood that turning of the supporting vehicle 58 turns the support plate 54 and results in rotation of the turning arm 38. The clamp 70 carries the pivotally mounted connecting bar 72 as the turning arm 38 is rotated. Rotation of the turning arm 38 may, of course, be either clockwise or counterclockwise, depending upon the direction in which the supporting vehicle 58 is turned. Therefore, the movement of the connecting bar 72 may be either forwardly or rearwardly, depending upon the direction of rotation of the turning arm 38. The connecting bar 72 transmits steering motion to the wheels 14. As disclosed in Figure 1, as the supporting vehicle 58 is turned to the left, the rear wheels 14 of the trailer 12 will be steered to the right. Thus, the rear wheels 14 will follow substantially the path taken by the wheels 56 of the supporting vehicle 58.

An adjustable means is provided on the turning arm 38 by means of the clamp 70 for adjusting the degree to which the rear wheels 14 turn with respect to the turning of the supporting vehicle 58. For various reasons it may be highly desirable to change the degree to which the rear wheels 14 are steered as the supporting vehicle 58 turns. It may be desired to have the rear wheels 14 follow the exact path taken by the supporting wheels 56 or it may be desirable to have the rear wheels 14 turn at a greater or lesser angle than that taken by the wheels 56 of the supporting vehicle. As may be clearly understood, the clamp adjustment means is easily accessible at the forward portion of the trailer 12. Therefore, a novel means is provided for the engaging of the forward end of a trailer and for the supporting of the forward end of the trailer. With this means, an adjustable turning means is provided for the trailer.

Instead of the wheels 56 and the frame 60 being part of a supporting vehicle, they could be included in the forward part of a four-wheel trailer, so that said arrangement of steering the rear wheels of a trailer can be employed equally well in four-wheel trailers and in two-wheel trailers. The attachment and steering means is well employed in a train of either two-wheel trailers or four-wheel trailers or in a single trailer of two or four wheels.

In the modification disclosed in Figure 7, the forward part of a four wheel trailer has been used for steering the rear wheels of the trailer. The structure is the same as that disclosed in the preferred modification, with the exception that the fifth wheel, instead of being mounted upon the rear part of a tractor, is mounted upon a bogie truck including the axle 160, the longitudinally extending frame members 158 and the transverse frame members 162. The two frame members 158 converge, as shown at 166, terminating in any conventional coupling unit 170, whereby the trailer may be towed by any suitable tractor. Members 158 and members 166 are either integral or rigidly connected. The axle 160 is journalled in the front wheels 156 of the trailer.

Although the preferred embodiment of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claims.

Having thus described my invention, I claim:

1. In a device of the character described, a trailer, a tractor, a fifth wheel mounted on said tractor and connected to said trailer, a support on said trailer provided with a pin rotatably mounted in a roller bearing, said fifth wheel being provided with a radial slot terminating in a rectangular opening, said pin having a rectangular portion at one of its ends so as to engage said rectangular opening, means for releasably locking said rectangular portion in said rectangular opening, the other end of said pin being splined so as to receive a lever arm provided with a splined opening so as to rotate said lever arm with said pin, a clamp attached to the lever arm and adjustably movable along the length thereof, a connecting link pivotably secured to said clamp and to a stub axle for turning the wheel on said trailer when said fifth wheel is turned.

2. In a device of the character described, a trailer, a vehicle, a fifth wheel mounted on said vehicle and connected to said trailer, a support on said trailer provided with a pin mounted in a bearing, said fifth wheel being provided with a radial slot terminating in a rectangular opening, said pin having a rectangular portion at one of its ends so as to engage said rectangular opening, means for releasably locking said rectangular portion in said rectangular opening, a lever arm non-rotatably mounted on the other end of said pin so that the lever arm rotates with said pin, a clamp attached to the lever arm and adjustably movable along the length thereof, a connecting link pivotally secured to said clamp and to a stub axle for turning the wheel on said trailer when said fifth wheel is turned, adjustment of said clamp on said lever arm thus varying the effective moment arm of said lever arm.

References Cited in the file of this patent

UNITED STATES PATENTS

| | | |
|---|---|---|
| 1,226,960 | Fageol | May 22, 1917 |
| 1,943,735 | Linton | Jan. 16, 1934 |
| 1,945,921 | Shaffer | Feb. 6, 1934 |
| 2,092,683 | Stidham | Sept. 7, 1937 |
| 2,100,447 | Mahaffey | Nov. 30, 1937 |
| 2,131,760 | Schaefer | Oct. 4, 1938 |
| 2,233,116 | Voorheis | Feb. 25, 1941 |
| 2,389,752 | Avery | Nov. 27, 1945 |

FOREIGN PATENTS

| | | |
|---|---|---|
| 948,629 | France | Jan. 31, 1949 |